(No Model.)
J. H. IRWIN.
REGULATOR FOR DYNAMO ELECTRIC MACHINES.
No. 260,575. Patented July 4, 1882.
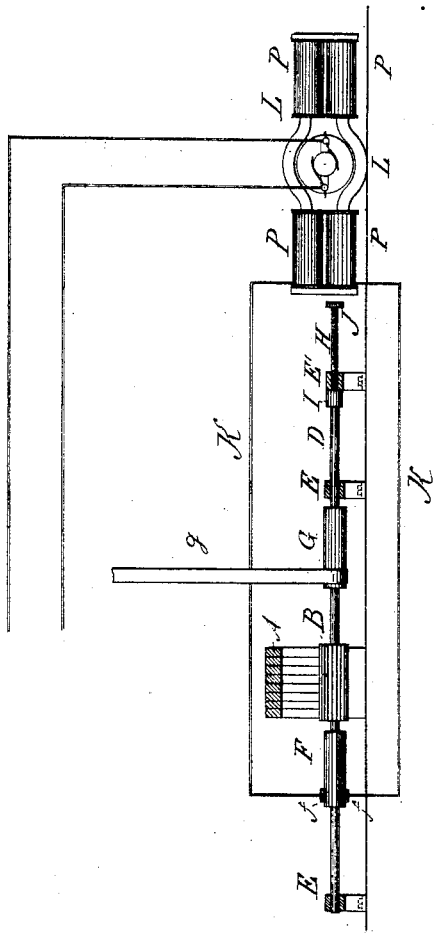
Witnesses
John Buckler
Wm. A. Lowe
Inventor
John H. Irwin,
By A. M. Pierce,
Atty.
N. PETERS. Photo-Lithographer, Washington, D. C.

UNITED STATES PATENT OFFICE.

JOHN H. IRWIN, OF MORTON, PENNSYLVANIA.

REGULATOR FOR DYNAMO-ELECTRIC MACHINES.

SPECIFICATION forming part of Letters Patent No. 260,575, dated July 4, 1882.

Application filed April 24, 1882. (No model.)

*To all whom it may concern:*

Be it known that I, JOHN H. IRWIN, of Morton, county of Delaware, and State of Pennsylvania, have invented certain new and useful Improvements in Dynamo-Electric Machines, of which the following is a full, clear, and exact description, reference being had to the accompanying drawing, and to the letters of reference marked thereon.

My invention relates especially to dynamo-electric machines or generators, and has for its object the production of a device wherein the strength of the current generated may be largely increased or decreased and accurately regulated, and wherein means are provided for magnetizing the field-of-force magnets of the generator.

It consists essentially in combining with a generator of any approved construction a magneto or exciting machine constructed and operating upon the principles fully set forth and described by me in an application for Letters Patent for an improvement in Dynamo-Electric Machines filed February 25, 1882; and my invention involves certain novel and useful combinations or arrangements of parts and peculiarities of construction and operation, all of which will be hereinafter first fully described, and then pointed out in the claims.

The accompanying drawing is a sectional view of an exciting-machine constructed in accordance with my invention in connection with a generator.

Like letters of reference indicate corresponding parts.

A are the permanent magnets of the exciting-machine, and B is the armature rotating between the poles of said magnets upon an elongated shaft, D, supported upon bearings E.

F is the commutator, and $ff$ are the brushes.

G is the pulley for rotating the armature located upon shaft D and driven by belt $g$.

H is a screw-threaded shaft passing through a correspondingly screw-threaded support, E'.

I is a clutch secured to shaft H, and adapted and arranged to loosely couple shafts D and H together, permitting free rotation of shaft D and at the same time holding it securely against longitudinal movement, excepting such as may be communicated thereto by means of screw H, when revolved by wheel J, attached to the extremity thereof. Said wheel may be provided with spokes radiating from its periphery for convenience in turning by hand.

K are conductors leading from brushes $f$ to the bobbins P upon magnets L of the generator.

When constructed and arranged in accordance with the foregoing description the engineer in charge of the generator may readily regulate the current generated in accordance with the demand of the circuit by moving armature B of the magneto-machine into or out of the field of the exciting-magnets, thereby increasing or decreasing the exciting-current passing to the generator.

Having now fully described my invention, what I claim as new therein, and desire to secure by Letters Patent, is—

1. In combination with a dynamo-electric machine or generator, an exciting magneto-machine whose armature is adapted and arranged to be drawn out of or pushed into its field-of-force magnets, whereby the strength of the exciting-current may be varied at will, substantially as described.

2. The combination, with an electric generator, of an exciting-machine having permanent magnets A, armature B, elongated shaft D, commutator F, screw H, regulated by wheel J, the conductors from said exciting-machine having connection with the bobbins surrounding the field-of-force magnets of the generator, substantially as set forth.

In testimony that I claim the foregoing I have hereunto set my hand in the presence of two witnesses.

JOHN H. IRWIN.

Witnesses:
F. W. HANAFORD,
A. M. PIERCE.